US012024042B2

(12) United States Patent
Hou et al.

(10) Patent No.: US 12,024,042 B2
(45) Date of Patent: Jul. 2, 2024

(54) METHODS AND SYSTEMS FOR CHARGING RATE MANAGEMENT BASED ON USAGE RATE OF CHARGING STATIONS

(71) Applicant: Noodoe Group Inc., Wilmington, DE (US)

(72) Inventors: Yi-An Hou, Taipei (TW); Chun-Hung Kung, Taipei (TW)

(73) Assignee: NOODOE GROUP INC., Wilmington, DE (US)

( * ) Notice: Subject to any disclaimer, the term of this patent is extended or adjusted under 35 U.S.C. 154(b) by 378 days.

(21) Appl. No.: 17/483,853

(22) Filed: Sep. 24, 2021

(65) Prior Publication Data

US 2022/0203858 A1    Jun. 30, 2022

(30) Foreign Application Priority Data

Dec. 31, 2020    (TW) ................... 109147204

(51) Int. Cl.
*B60L 53/62* (2019.01)
*B60L 53/63* (2019.01)
*B60L 53/68* (2019.01)
*B60L 58/12* (2019.01)

(52) U.S. Cl.
CPC ............ *B60L 53/62* (2019.02); *B60L 53/63* (2019.02); *B60L 53/68* (2019.02); *B60L 58/12* (2019.02)

(58) Field of Classification Search
USPC ........................................ 320/109
See application file for complete search history.

(56) References Cited

U.S. PATENT DOCUMENTS

| 2013/0179061 A1* | 7/2013 | Gadh | B60L 53/305 701/1 |
| 2014/0184170 A1* | 7/2014 | Jeong | G06Q 50/06 320/137 |
| 2019/0130318 A1* | 5/2019 | Lee | G06Q 10/02 |

* cited by examiner

*Primary Examiner* — Samuel Berhanu
*Assistant Examiner* — Javier A. Bernal Sosa
(74) *Attorney, Agent, or Firm* — McClure, Qualey & Rodack, LLP (57) ABSTRACT

Methods and systems for charging rate management based on usage rate of charging stations for use in a server are provided. The charging field includes a plurality of electric vehicle charging stations for charging at least one electric vehicle. First, the server connects to each of the electric vehicle charging stations through the network to obtain a usage status of the respective electric vehicle charging station. Then, the server calculates a usage rate of the charging field according to the usage status of the respective electric vehicle charging station, and determines a charging rate for the charging field according to the usage rate.

8 Claims, 7 Drawing Sheets

METHODS AND SYSTEMS FOR CHARGING RATE MANAGEMENT BASED ON USAGE RATE OF CHARGING STATIONS

BACKGROUND OF THE INVENTION

Field of the Invention

The disclosure relates generally to charging management methods and systems thereof, and, more particularly to methods and systems for charging rate management based on usage rate of charging stations.

Description of the Related Art

Recently, with the rising awareness of environmental protection and electric vehicle technology advances, the development of electric vehicles powered by electrical energy to replace traditional vehicles powered by fossil fuels has gradually become an important goal in the automotive field, thus making electric vehicles become more and more popular. In order to increase the range and willingness to use electric vehicles, many countries or cities have begun to set up charging stations in public places to provide electricity to electric vehicles, and have also begun to plan the deployment of a large number of charging stations in urban areas or scenic areas, so as to make the charging of electric vehicles more convenient.

With the increasing popularity of electric vehicles, many charging point operators have also begun to set up electric vehicle charging stations in many places. Electric vehicle owners can use the charging station to perform a charging operation on their electric vehicles to obtain the required electricity, and the charging point operators can charge for the charging operation to collect the corresponding charging fees. Compared with the time required for traditional vehicles to refuel, the time required for charging electric vehicles is significantly longer and the stations for charging is limited. When the electric vehicle charging station has been used, the electric vehicle owners may need to wait because the charging station is used. If the waiting time is too long, it is inconvenient for users, and the willingness of electric vehicle owners to use is also reduced. In addition, in some off-peak hours, electric vehicle charging stations may not be charged for a long time, resulting in idle time for electric vehicle charging stations, which causes charging point operators and users to be unable to achieve the best benefits.

BRIEF SUMMARY OF THE INVENTION

The present invention provides methods and systems for charging rate management based on usage rate of charging stations, which can detect the usage status of electric vehicle charging stations in the charging field in real time, judge the usage rate of the charging field based on the usage status, and dynamically determine a charging rate for the charging field according to the usage rate. Therefore, the present invention can provide a flexible charging and billing mechanism, and provide users with a good experience and improve the charging services. At the same time, it can also increase the revenue of electric vehicle charging stations and reduce the idle time of electric vehicle charging stations, thereby improving the utilization rate of electric vehicle charging stations.

In a method for charging rate management based on usage rate of charging stations, a server connects to electric vehicle charging stations of a charging field through a network to obtain a usage status of the respective electric vehicle charging station. Then, the server calculates a usage rate of the charging field according to the usage status of the respective electric vehicle charging station, and determines a charging rate for the charging field according to the usage rate.

An embodiment of a system for charging rate management based on usage rate of charging stations comprises a charging filed and a server. The charging filed comprises a plurality of electric vehicle charging stations for charging at least one electric vehicle. The server connects to the respective electric vehicle charging station of the charging field via a network, and obtains a usage status of the respective electric vehicle charging station via the network. The server calculates a usage rate of the charging field according to the usage status of the respective electric vehicle charging station, and determines a charging rate for the charging field according to the usage rate.

In some embodiments, the server further receives a charging request from a mobile device or from a specific electric vehicle charging station of the electric vehicle charging stations, and in response to the charging request, instructs the specific electric vehicle charging station to perform a charging operation, and bills for the charging operation based on the charging rate.

In some embodiments, the charging rate is based on a charging time or a charging power as a unit.

In some embodiments, the server determines whether the usage rate is greater than a first threshold value, and sets the charging rate to a first rate when the usage rate is not greater than the first threshold value.

In some embodiments, the server sets the charging rate to a second rate when the usage rate is greater than the first threshold value, wherein the second rate is greater than the first rate.

In some embodiments, the server determines whether the usage rate is greater than a second threshold value, and sets the charging rate to a differential rate when the usage rate is greater than the second threshold value, wherein the second threshold value is greater than the first threshold value, and the differential rate starts from a specific rate and increases as the charging time continues.

Methods for charging rate management based on usage rate of charging stations may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof.

Figure 1:
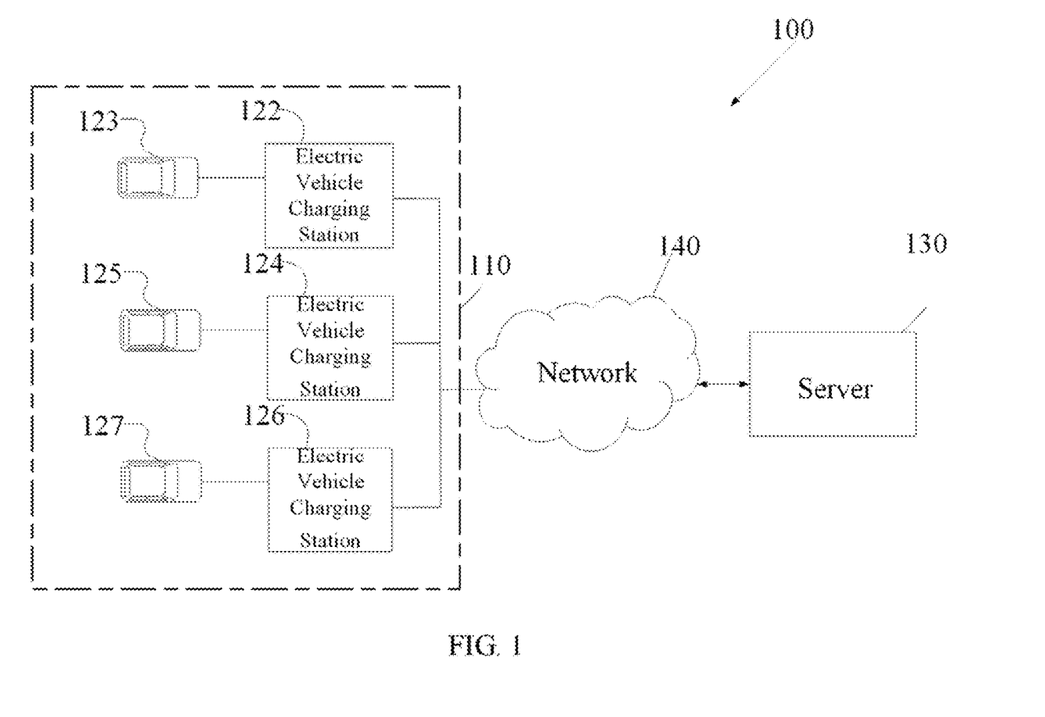
FIG. 1 is a schematic diagram illustrating an embodiment of a system for charging rate management based on usage rate of charging stations of the invention.

FIG. 1 is a schematic diagram illustrating an embodiment of a system for charging rate management based on usage rate of charging stations of the invention. As shown in FIG. 1, the system for charging rate management based on usage rate of charging stations 100 comprises at least a charging field 110 and a server 130, wherein the charging field 110 comprises at least a plurality of electric vehicle charging stations 122, 124, and 126, and the server 130 can remotely connect to the electric vehicle charging stations 122, 124, and 126 via a network 140. It should be noted that, the number of the aforementioned electric vehicle charging stations are only examples of this case, and the present invention is not limited thereto. The present invention can be applied to any charging field with electric vehicle charging stations. It is noted that, the charging field 110 is a field that can provide charging services for electric vehicles. In some embodiments, the network 140 may be a wired network, a telecommunication network, and a wireless network, such as a Wi-Fi network.

The server 130 can receive various data from the electric vehicle charging stations 122, 124, and 126 through the network 140, such as the usage status, charging information, and so on of the electric vehicle charging stations 122, 124, and 126. The usage status of the electric vehicle charging stations 122, 124, and 126 can be used to indicate whether the electric vehicle charging stations 122, 124, or 126 have been used. For example, the electric vehicle charging station 122 can continuously transmit the usage status of the electric vehicle charging station 122 through the network 140, and the server 130 can receive the corresponding usage status from the electric vehicle charging station 122 through the network 140. Similarly, the electric vehicle charging station 124 can continuously transmit the usage status of the electric vehicle charging station 124 through the network 140, and the server 130 can receive the corresponding usage status from the electric vehicle charging station 124 through the network 140. Similarly, the electric vehicle charging station 126 can continuously transmit the usage status of the corresponding electric vehicle charging station 126 through the network 140, and the server 130 can receive the corresponding usage status from the electric vehicle charging station 126 through the network 140. For example, when the electric vehicle 123 is coupled to the electric vehicle charging station 122 through a charging gun of the electric vehicle charging station 122 to perform a charging operation, the electric vehicle charging station 122 can continuously perform the charging operation for the electric vehicle 123, and transmit the corresponding charging information through the network 140. The server 130 can receive the charging information of the charging operation from the electric vehicle charging station 122 through the network 140. Similarly, when the electric vehicle 125 is coupled to the electric vehicle charging station 124 through a charging gun of the electric vehicle charging station 124 to perform a charging operation, the electric vehicle charging station 124 can continuously perform the charging operation for the electric vehicle 125, and transmit the charging information through the network 140. The server 130 can receive the charging information of the charging operation from the electric vehicle charging station 124 through the network 140.

A user can connect the electric vehicle 123 and the electric vehicle charging station 122 to each other to send a charging request corresponding to the electric vehicle charging station 122, so as to use the electric vehicle charging station 122 to charge the electric vehicle 123. Similarly, a user can connect the electric vehicle 125 and the electric vehicle charging station 124 to each other to send a charging request corresponding to the electric vehicle charging station 124, so as to use the electric vehicle charging station 124 to charge the electric vehicle 125. The user can connect the electric vehicle 127 and the electric vehicle charging station 126 to each other to send a charging request corresponding to the electric vehicle charging station 126, so as to use the electric vehicle charging station 126 to charge the electric vehicle 127.

In some embodiments, the server 130 may directly or indirectly receive a charging request from a user device (not shown in FIG. 1) of the owner of the electric vehicle 123, and after payment confirmation and/or identity confirmation in response to the charging request, generate and transmit a charging authorization command to the electric vehicle charging station 122 through the network 140 to allow the electric vehicle charging station 122 to output power to the electric vehicle 123 (such as an electric motorcycle or an electric vehicle, etc.) that is electrically connected to it, or prohibit the electric vehicle charging station 122 from outputting electric power to the electric vehicle 123. In some embodiments, the user of the electric vehicle 123 can use the user device to download and install an application from the server 130 via the network 140, and generate a charging request through the user interface of the application. In some embodiments, the user can scan a Quick Response Code (QR code) on the electric vehicle charging station 122 through the scanning function of the application to generate the charging request, thereby starting a charging operation. For example, in one embodiment, the electric vehicle charging station 122 may be a charging pole, which may be equipped with a single or multiple charging guns, and can be used when the electric vehicle is coupled to the electric vehicle charging station 122 through the charging gun, such that the electric vehicle 123 is charged with the electric power through the charging gun in the charging operation. In an embodiment, the electric vehicle charging station 122 can provide an electric vehicle 123 for charging. In another embodiment, the electric vehicle charging station 122 can provide multiple electric vehicles 123 for charging at the same time. In some embodiments, the electric vehicle charging stations 122, 124, and 126 may be home chargers or commercial chargers. The user device can be any electronic device capable of Internet access, such as a mobile device. The mobile device may be a mobile phone smart phone personal digital assistant, global positioning system, and/or notebook computer.

In some embodiments, the user device can receive status information and notifications of the corresponding charging operation from the server 130 through the network 140. For example, the information be notifying that the electric vehicle has stopped charging, notifying that the electric vehicle should be moved, notifying that the charging gun of the electric vehicle charging station has been pulled out of the electric vehicle and so on. The server 130 can generate an instruction and send the instruction to the electric vehicle charging station 122 through the network 140 to control the electric vehicle charging station 122 to output power to the electric vehicle 123 electrically connected to it at a specified output power efficiency at a specific time period, or prohibit the electric vehicle charging station 123 from outputting electric power to the electric vehicle 126. Similarly, the server 130 can generate an instruction and transmit the instruction to the electric vehicle charging station 124 through the network 140, so as to control the electric vehicle charging station 124 to output power to the electric vehicle 125 electrically connected to it at a specified output power efficiency during a specific period of time, or prohibit the electric vehicle charging station 124 from outputting electric power to the electric vehicle 125. Similarly, the server 130 can generate instructions and transmit the instructions to the electric vehicle charging station 126 via the network 140 to control the electric vehicle charging station 126 to output power to the electric vehicle 127 electrically connected to it at a specified output power efficiency during a specific period of time, or prohibit the electric vehicle charging station 126 from outputting electric power to the electric vehicle 127.

Figure 2:
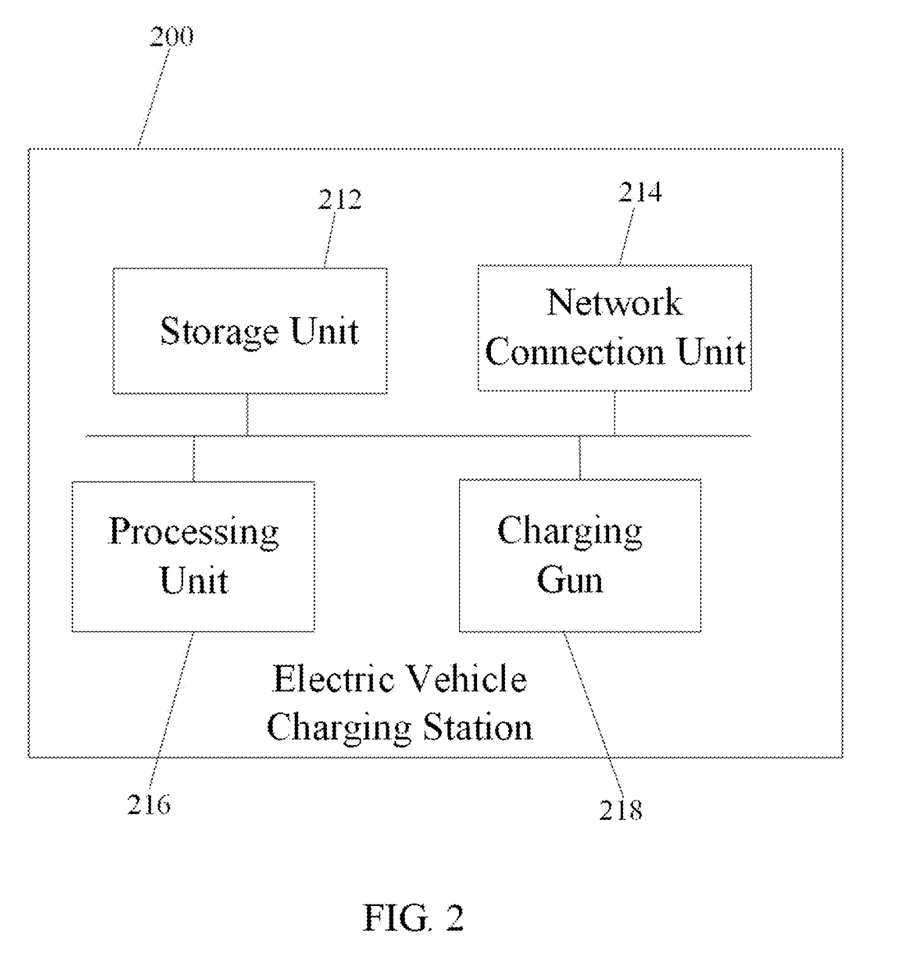
FIG. 2 is a schematic diagram illustrating an embodiment of an electric vehicle charging station of the invention.

FIG. 2 is a schematic diagram illustrating an embodiment of an electric vehicle charging station of the invention. The electric vehicle charging station 200 shown in FIG. 2 can be applied to the electric vehicle charging stations 122, 124 and 126, which has processing and computing capabilities to perform charging management operations for the electric vehicle charging station 200. The electric vehicle charging station 200 has a network connection capability to receive, download or update various parameters and information required for charging management calculations.

The electric vehicle charging station 200 at least comprises a storage unit 212, a network connection unit 214, a processing unit 216, and a charging gun 218. The storage unit 212 may be a memory or a database for storing and recording related data, such as related information of the electric vehicle charging station and charging requests. It should be noted that the aforementioned information is only example, and the invention is not limited thereto. The network connection unit 214 can use a network, such as a wired network, a telecommunications network, and a wireless network, such as a Wi-Fi network, to receive, download, or update various parameters and information required for charging management operations. The processing unit 216 can control related operations of software and hardware in the electric vehicle charging station 200, and perform the methods for charging rate management based on usage rate of charging stations, which will be discussed later. For example, the processing unit 216 may be a general-purpose controller, a microcontroller (Micro-Control Unit, MCU), or a digital signal controller (Digital Signal Processor, DSP), etc., to provide data analysis, processing, and calculation operations. In one embodiment, the processing unit 216 may use the network connection unit 214 to transmit the usage status of the electric vehicle charging station 200 to a server, such as the server 130 through a network for subsequent charging management. In another embodiment, the processing unit 216 can obtain the output power efficiency through the server 130, and charge at least one electric vehicle according to the output power efficiency received from the server 130. The charging gun 218 may include one or more charging connectors that have the same charging interface specification or have different charging interface specifications. The charging gun 218 is electrically connected to the electric vehicle, and outputs power to the electric vehicle at a specified charging efficiency according to the instruction of the processing unit 216.

Figure 3:
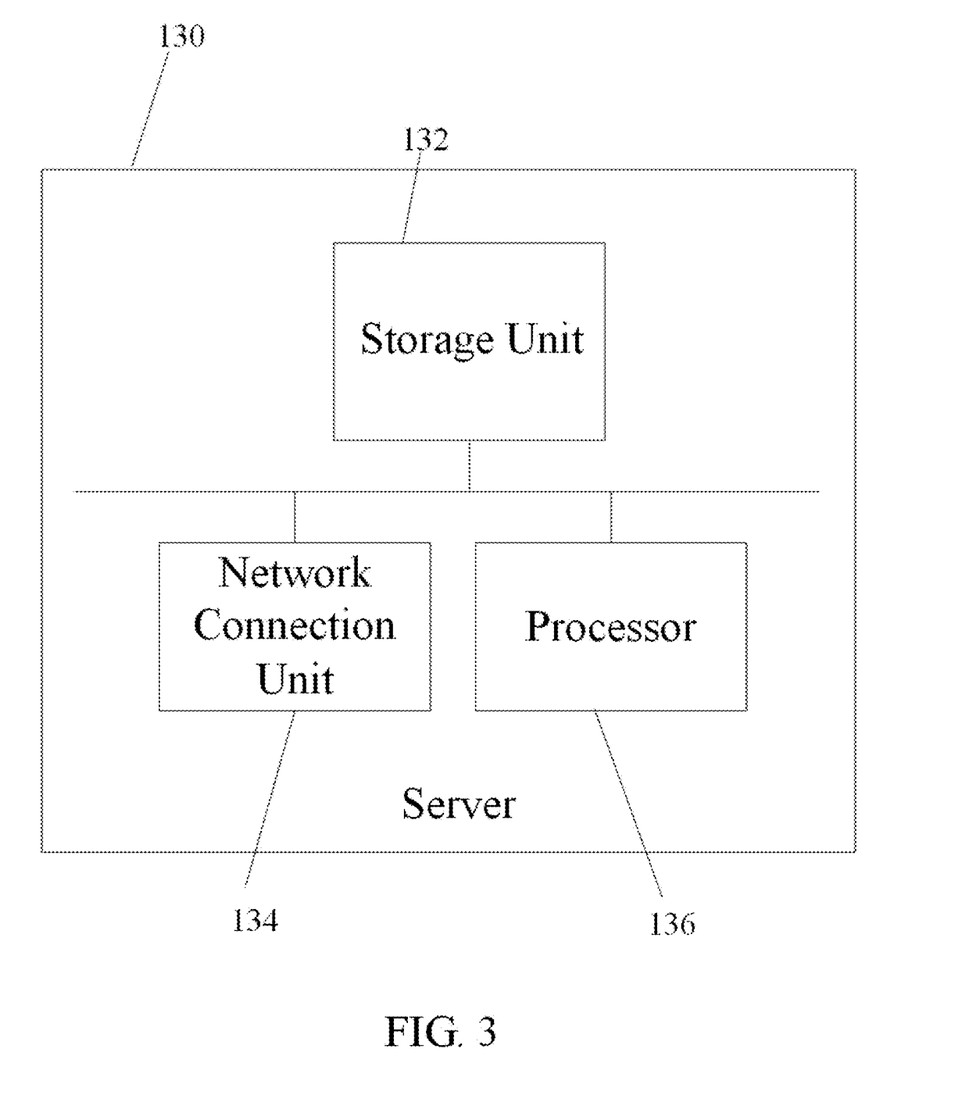
FIG. 3 is a schematic diagram illustrating an embodiment of a server of the invention.

FIG. 3 is a schematic diagram illustrating an embodiment of a server of the invention. As shown in FIG. 3, the server 130 of the invention can be any processor-based electronic device, which comprises at least a storage unit 132, a network connection unit 134, and a processor 136. It is noted that, the server 130 can receive various data corresponding to a plurality of electric vehicle charging stations. The server 130 can directly or indirectly receive a charging request from a mobile device or a specific electric vehicle charging station, and after completing actions such as identity confirmation in response to the charging request, generate a charging authorization command and transmit it to the corresponding electric vehicle charging station via the network. In response to the charging authorization command, the electric vehicle charging station is allowed to output power to an electric vehicle (for example, an electric motorcycle or an electric vehicle, etc.) that is electrically connected to it, or prohibit the electric vehicle charging station from outputting power to the electric vehicle. The electric vehicle charging station may be a charging pole or a charging pile, which may have a single or multiple charging guns, and output electric power through the charging guns to charge the electric vehicle.

The storage unit 132 may be a memory, which can store and record related data, such as various data of the electric vehicle charging stations 122, 124, and 126, etc. The server 130 can connect to and communicate with the electric vehicle charging stations 122, 124, and 126 via the network 140. The network connection unit network, such as a wired network, a telecommunication network, and a wireless network, such as a Wi-Fi network, thus to transmit data to the respective electric vehicle charging stations through the network to control whether the electric vehicle charging station outputs power at a specify output power efficiency to charge an electric vehicle. The processor 136 can control the related operations of software and hardware in the server 130, and perform the methods for charging rate management based on usage rate of charging stations of the invention, which will be discussed later. For example, the processor 136 may be a general-purpose controller, a microcontroller (Micro-Control Unit, MCU), or a digital signal controller (Digital Signal Processor, DSP), etc., to provide data analysis, processing, and calculation functions. The server 130 can generate instructions and transmit the instructions to the electric vehicle charging stations 122, 124, and 126 through the network 140 to schedule and control the electric vehicle charging stations 122, 124, and 126 to output power to the electric vehicle at a specified output power efficiency at a specific time period, or prohibit the electric vehicle charging stations 122, 124, and 126 from outputting electric power to the electric vehicle. The processor 136 can obtain the usage status of the electric vehicle charging stations 122, 124, and 126 through the network, and perform subsequent charging management operations based on the usage status of the electric vehicle charging stations 122, 124, and 126.

Figure 4:
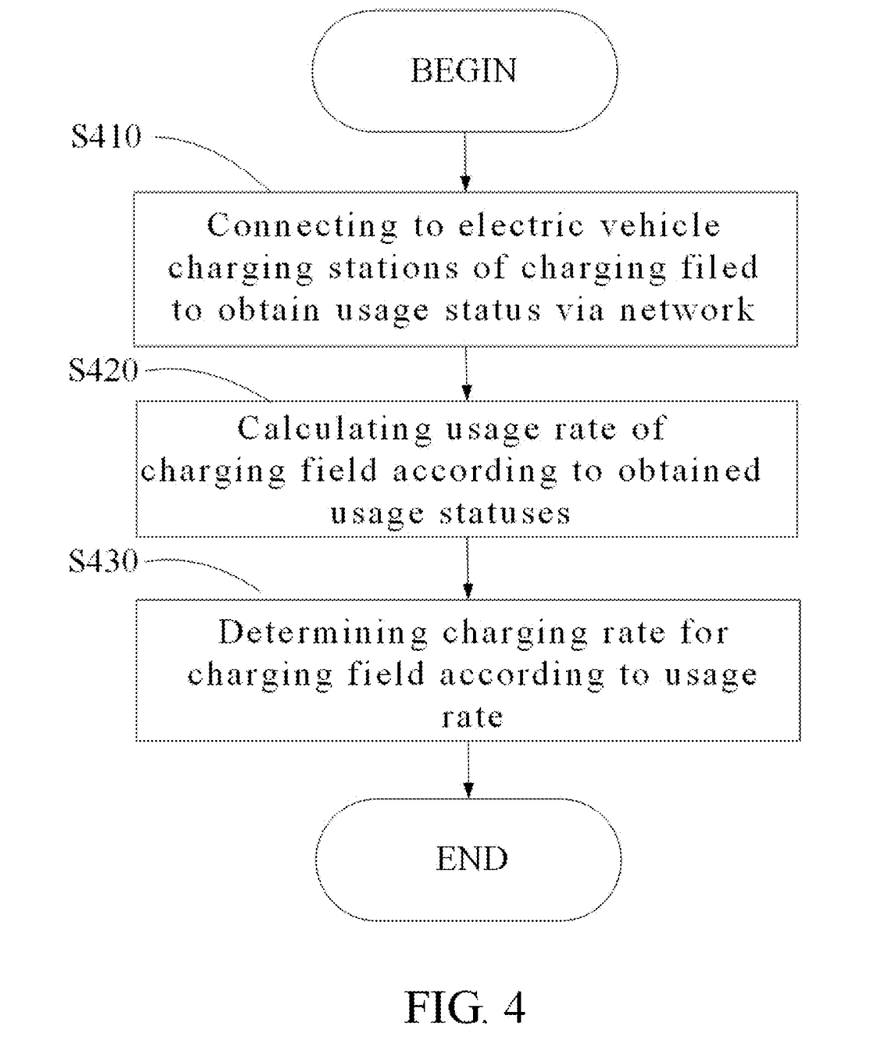
FIG. 4 is a flowchart of an embodiment of a method for charging rate management based on usage rate of charging stations of the invention.

FIG. 4 is a flowchart of an embodiment of a method for charging rate management based on usage rate of charging stations of the invention. The method for charging rate management based on usage rate of charging stations of the invention is applicable to a charging field with a plurality of electric vehicle charging stations and a server connected to the electric vehicle charging stations through a network, such as the charging field 110 and the server 130 in FIG. 1. The server can be coupled to the respective electric vehicle charging station in the charging field through a network, such as a wired network, a telecommunications network, and a wireless network, such as a Wi-Fi network.

In step S410 the server connects to the respective electric vehicle charging station through the network to obtain a usage status of the respective electric vehicle charging station. As mentioned above, the server can connect to the respective electric vehicle charging station in the charging field through the network, and the respective electric vehicle charging station can transmit its usage status to the server through the network. The usage status of a specific electric vehicle charging station can be used to indicate whether the specific electric vehicle charging station has been used. After the usage status of the respective electric vehicle charging station is obtained, in step S420, the server calculates the usage rate of the charging field according to the usage statuses of the respective electric vehicle charging stations, and, in step S430, determines a charging rate of the charging field according to the usage rate. Specifically, the usage rate of the charging field is used to indicate the ratio of the number of electric vehicle charging stations that have been used in the charging field to the total number of all electric vehicle charging stations in the charging field. In one embodiment, the usage rate of the charging field=(the number of electric vehicle charging stations that have been used/the total number of electric vehicle charging stations)× 100%. It is noted that, the present invention is not limited thereto. For example, assuming that there are five electric vehicle charging stations in the charging field, the usage rate of the charging field is 20% when one electric vehicle charging station in the charging field is used, and the usage rate of the charging field is 40% when two electric vehicle charging stations in the charging field are used, and so on. In some embodiments, the charging rate includes a first rate with a lower charging cost and a second rate with a higher charging cost. The server will set the charging rate of the charging field to the first rate when the usage rate is low, and the server will set the charging rate of the charging field to the second rate when the usage rate is high. In some embodiments, the charging rate includes a fixed rate and a differential rate, wherein the differential rate starts from a specific rate and increases as the charging time continues. For example, the fixed rate can be 60 NT dollars for one hour of charging (hereinafter referred to as 60 NTD per hour), and the differential rate is 60 NT dollars for the first hour. 120 NT dollars for the second hour, 180 NT dollars for the third hour, and so on. It is understood that, the present invention is not limited to the above example. When the usage rate is not greater than an upper limit, the server sets the charging rate of the charging field to a fixed rate. When the usage rate is greater than the upper limit, the server sets the charging rate of the charging field to a differential rate. In the above example, when the user spends three hours in the charging operation, the charging fee charged by the fixed rate is 180 NT dollars, and the charging fee charged by the differential rate is 360 NT dollars. In other words, the longer the charging time, the greater the gap between the differential rate and the fixed rate. Therefore, the difference between the charging fee charged by the differential rate and the charging fee charged by the fixed rate is also greater. Since the differential rate increases with the duration of charging, the longer the charging, the higher the charging cost. This will encourage the charging electric vehicle owner to shorten the charging time or properly arrange the charging schedule, which can reduce the time spent on the electric vehicle charging station, so that more people have the opportunity to use the charging field for charging.

Figure 5:
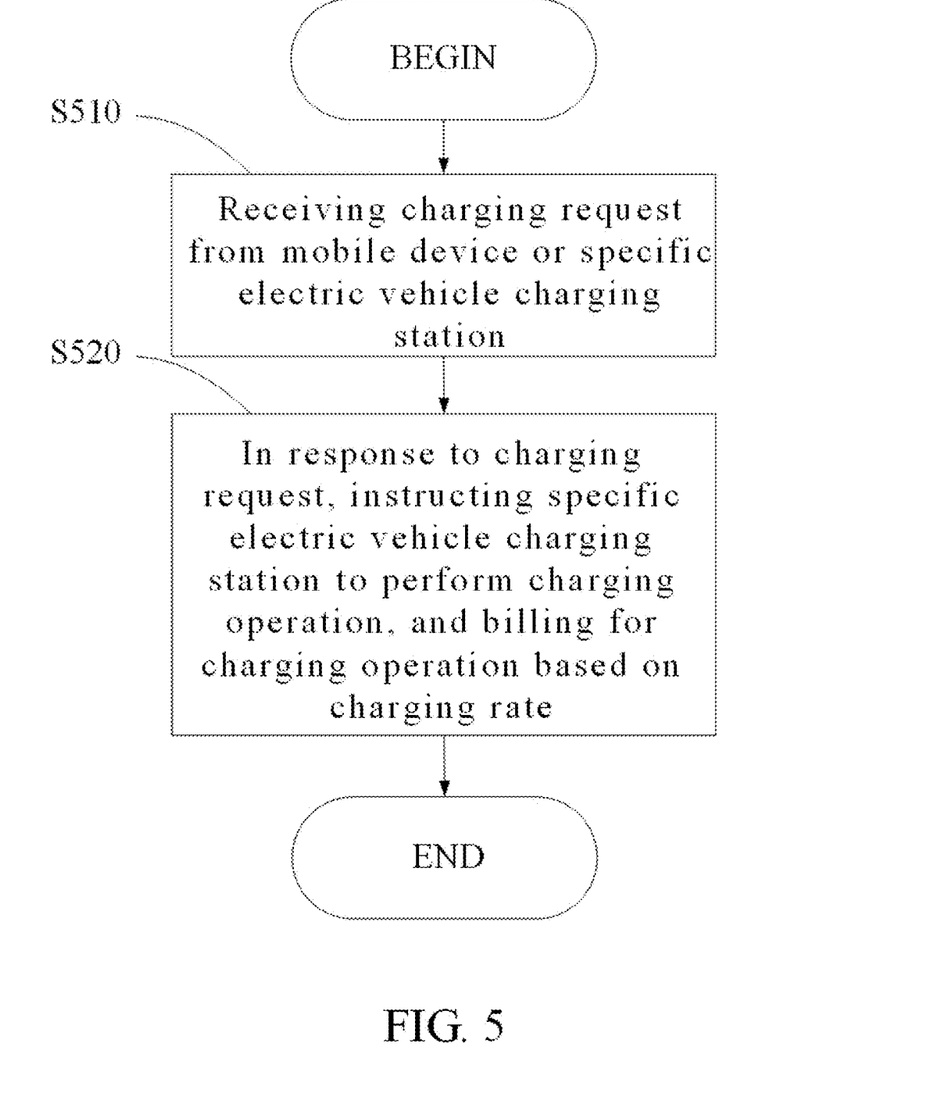
FIG. 5 is a flowchart of another embodiment of a method for charging rate management based on usage rate of charging stations of the invention.

FIG. 5 is a flowchart of another embodiment of a method for charging rate management based on usage rate of charging stations of the invention. The method for charging rate management based on usage rate of charging stations of the invention is applicable to a charging field with a plurality of electric vehicle charging stations and a server connected to the electric vehicle charging stations through a network, such as the charging field 110 and the server 130 in FIG. 1. The server can be coupled to the respective electric vehicle charging station in the charging field through a network, such as a wired network, a telecommunications network, and a wireless network, such as a Wi-Fi network.

In step S510, the server receives a charging request from a mobile device or from a specific electric vehicle charging station of the electric vehicle charging stations. As mentioned above, the mobile device can be any electronic device with Internet access and positioning capabilities, such as a mobile phone, smart phone, personal digital assistant, global positioning system, notebook computer, and in-vehicle devices. In one embodiment, a specific user of the mobile device can use the mobile device to generate the charging request for the specific electric vehicle charging station. In another embodiment, when the specific user is the owner of the electric vehicle and the specific electric vehicle charging station is connected to the electric vehicle to charge the electric vehicle, the specific user can generate the charging request for the specific electric vehicle charging station through the mobile device. In other words, the charging request can be sent to the server via the network from the mobile device of the specific user corresponding to the electric vehicle. In some embodiments, users of electric vehicles can use their mobile devices to download and install an application through a network routing server, so as to generate the charging request through the user interface of the application. In some embodiments, the charging request can be sent to the server by a specific electric vehicle charging station via the network. Then, in step S520, in response to the charging request, the server instructs the specific electric vehicle charging station to perform a charging operation, and bills the charging operation according to the charging rate. In this step, the server can calculate the charging fee corresponding to the charging operation according to the charging rate. When the charging rate is the first rate, the server charges for the charging operation based on the first rate. When the charging rate is the second rate, the server charges for the charging operation based on the second rate.

Figure 6:
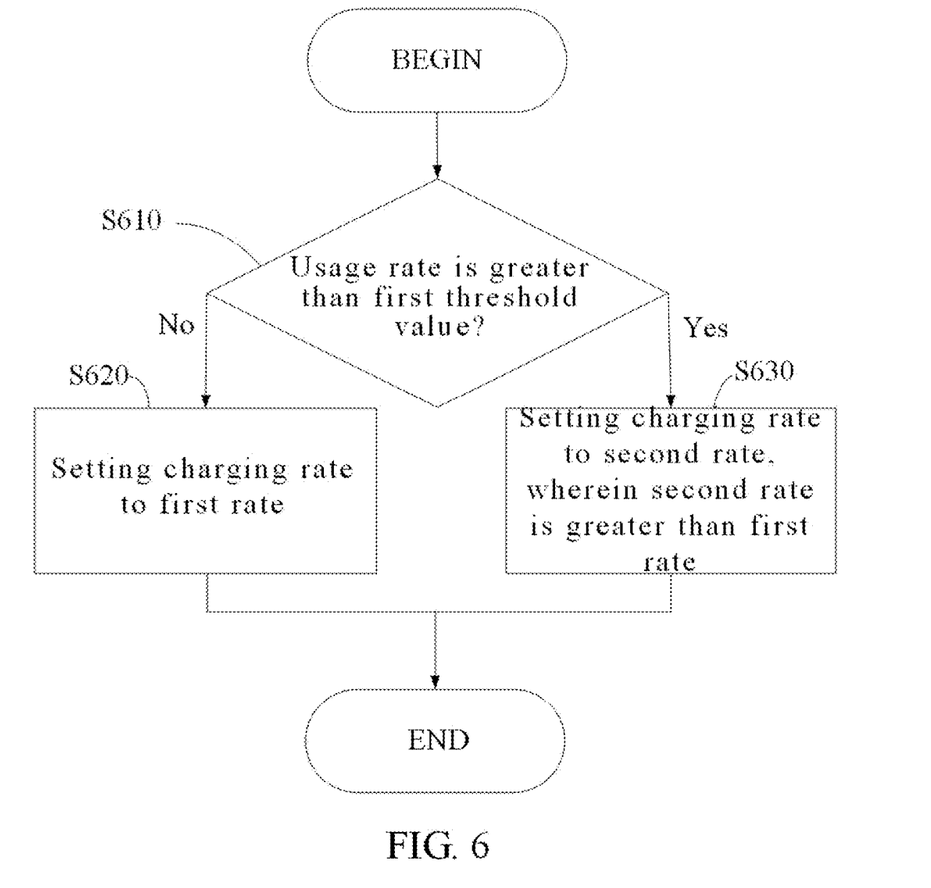
FIG. 6 is a flowchart of an embodiment of a method for determining the charging rate for a charging field of the invention.

FIG. 6 is a flowchart of an embodiment of a method for determining the charging rate for a charging field of the invention. The method for determining the charging rate for a charging field of the invention is applicable to a charging field with a plurality of electric vehicle charging stations and a server connected to the electric vehicle charging stations through a network, such as the charging field 110 and the server 130 in FIG. 1. The server can be coupled to the respective electric vehicle charging station in the charging field through a network, such as a wired network, a telecommunications network, and a wireless network, such as a Wi-Fi network. In this embodiment, the charging rate includes at least a first rate and a second rate, wherein the second rate is higher than the first rate.

In step S610, the server determines whether the usage rate of the charging field is greater than a first threshold value. In this step, the server can set the first threshold value and calculate the usage rate of the charging field according to the obtained usage status of the respective electric vehicle charging station, and then determine whether the usage rate of the charging field is greater than the first threshold value. As mentioned above, the usage rate of the charging field can be used to indicate the ratio of the number of electric vehicle charging stations that have been used in the charging field to the total number of all electric vehicle charging stations in the charging field. For example, in one embodiment, the usage rate of the charging field=(the number of electric vehicle charging stations that have been used/the total number of electric vehicle charging stations)×100%. For example, assuming that there are five electric vehicle charging stations in the charging field, the usage rate of the charging field is 20% when one electric vehicle charging station in the charging field is used, and the usage rate of the charging filed is 40% when there are two electric vehicle charging stations in the charging field are used, and so on. In one embodiment, the first threshold value may be set to 30%. Therefore, in step S610, it is determined whether the usage rate is greater than 30%. It is determined that the usage rate is greater than the first threshold value when the usage rate is greater than 30%, and it is determined that the usage rate is not greater than the first threshold value when the utilization rate is not greater than 30%. When the usage rate is not greater than the first threshold value (No in step S610), in step S620, the server sets the charging rate to the first rate. When the usage rate is greater than the first threshold value (Yes in step S610), in step S630, the server sets the charging rate to the second rate.

Figure 7:
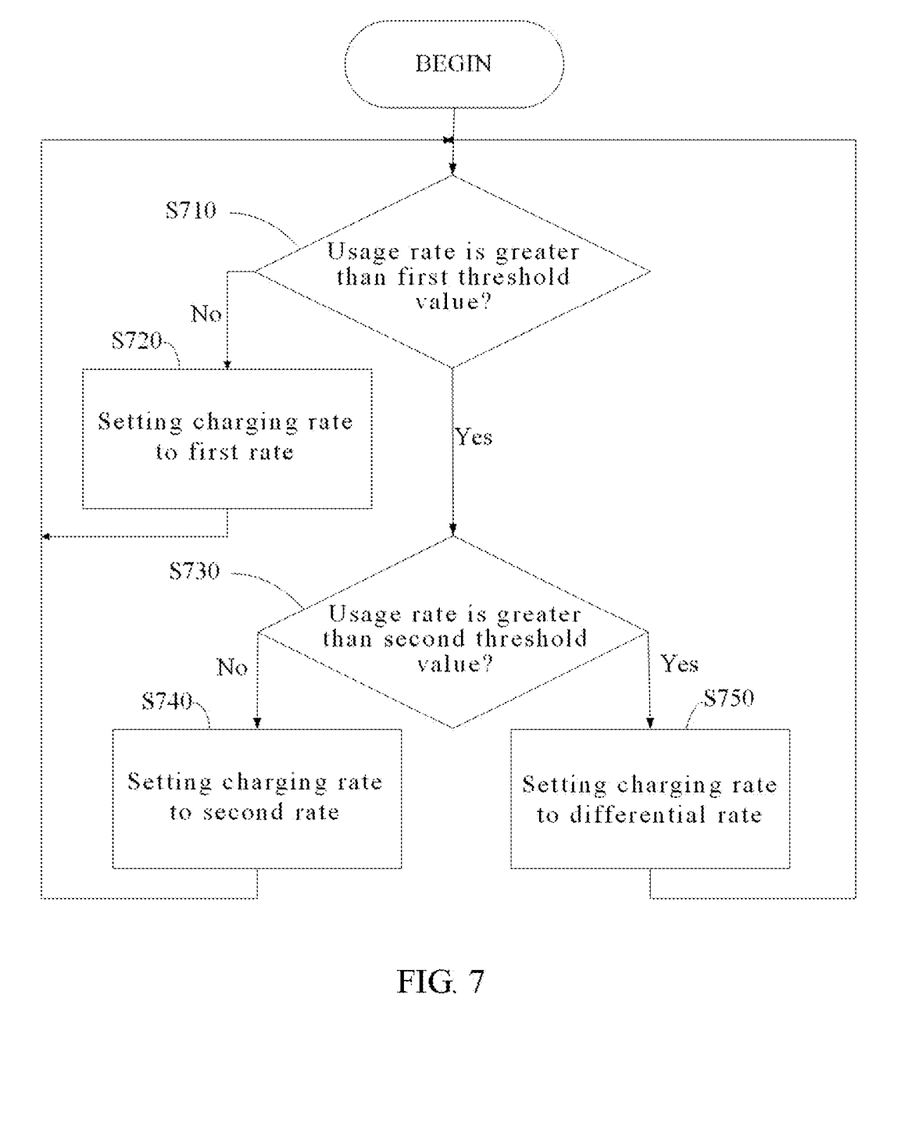
FIG. 7 is a flowchart of another embodiment of a method for determining the charging rate for a charging field of the invention.

FIG. 7 is a flowchart of another embodiment of a method for determining the charging rate for a charging field of the invention. The method for determining the charging rate for a charging field of the invention is applicable to a charging field with a plurality of electric vehicle charging stations and a server connected to the electric vehicle charging stations through a network, such as the charging field 110 and the server 130 in FIG. 1. The server can be coupled to the respective electric vehicle charging station in the charging field through a network, such as a wired network, a telecommunications network, and a wireless network, such as a Wi-Fi network. In this embodiment, the charging rate includes at least a first rate, a second rate, and a differential rate. The first rate and the second rate are fixed rates and the second rate is higher than the first rate. The differential rate starts from a specific rate and increases as the charging time continues.

In step S710, the server determines whether the usage rate of the charging field is greater than a first threshold value. When the usage rate is not greater than the first threshold (No in step S710), in step S720, the server sets the charging rate to the first rate. When the usage rate is greater than the first threshold value (Yes in step S710), in step S730, the server determines whether the usage rate is greater than a second threshold value. When the usage rate is greater than the first threshold value and is not greater than the second threshold value (No in step S730), in step S740, the server sets the charging rate to the second rate. When the usage rate is greater than the second threshold value (Yes in step S740), in step S750, the server sets the charging rate to a differential rate.

For example, in one embodiment, the first threshold value is set to 30%, the second threshold value is set to 60%, and there are five electric vehicle charging stations in the charging field. The usage rate of the charging field is 20% when one electric vehicle charging station is used in the charging field. At this time, the usage rate is not greater than the first threshold value, so the server sets the charging rate as the first rate (for example, 30 NTD per hour). When two electric vehicle charging stations are used in the charging field, the usage rate of the charging field is 40%, which is greater than the first threshold value but not greater than the second threshold value, so the server sets the charging rate to the second rate (for example: 60 NTD per hour). When four electric vehicle charging stations are used in the charging field, the usage rate of the charging field is 80%, which is greater than the second threshold value. Therefore, the server sets the charging rate as a differential rate (for example, 60 NTD for the first hour, 120 NTD for the second hour, 180 NTD for the third hour, and so on). When the usage statuses of electric vehicle charging stations indicates that only two stations are left in use, the usage rate becomes 40%, so the server can adjust the charging rate from the differential rate back to the second rate. In other words, in this embodiment, the server can dynamically determine and adjust the charging rate of the charging field according to the real-time usage rate of the electric vehicle charging stations in the charging field, and charge at a lower rate when the usage rate is low. When the usage rate is higher than a predetermined threshold value, the differential rate pricing is activated. Therefore, electric vehicle owners can be encouraged to perform charging operations at a more favorable rate during the period of lower usage rate, thereby effectively increasing the utilization rate of electric vehicle charging stations in the charging field in peak-off time. It must be noted that, the number, threshold value, and charging rate are only examples of this case, and the present invention is not limited thereto.

Therefore, the methods and systems for charging rate management based on usage rate of charging stations of the present invention can detect the usage statuses of all electric vehicle charging stations in the charging field in real time, calculate the usage rate of the charging field based on the usage statuses, and dynamically determine the charging rate for the charging field based on the usage rate. Therefore, this case can provide a flexible charging and billing mechanism. The flexible charging rate design can effectively reduce the idle time of electric vehicle charging stations and increase the service utilization rate of electric vehicle charging stations, and provide users with a good experience and improve the charging services. At the same time, it can also increase the revenue of electric vehicle charging stations and reduce the idle time of electric vehicle charging stations, thereby improving the utilization rate of electric vehicle charging stations.

Methods for charging rate management based on usage rate of charging stations, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for executing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for executing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalent.

What is claimed is:

1. A method for charging rate management based on usage rate of charging stations for use in a server, comprising:
    connecting to a plurality of electric vehicle charging stations of a charging field via a network by the server, wherein the electric vehicle charging stations is used for charging at least one electric vehicle;
    obtaining a usage status of the respective electric vehicle charging station via the network by the server;
    calculating a usage rate of the charging field according to the usage status of the respective electric vehicle charging station; and
    determining a charging rate for the charging field according to the usage rate,
    wherein the determination step further comprises:
    determining whether the usage rate is greater than a first threshold value;
    setting the charging rate to a first rate when the usage rate is not greater than the first threshold value;
    determining whether the usage rate is greater than a second threshold value, wherein the second threshold value is greater than the first threshold value; and
    setting the charging rate to a differential rate when the usage rate is greater than the second threshold value, wherein the differential rate starts from a specific rate and increases as the charging time continues.

2. The method of claim 1, further comprising:
    receiving a charging request from a mobile device or from a specific electric vehicle charging station of the electric vehicle charging stations by the server; and
    in response to the charging request, instructing the specific electric vehicle charging station to perform a charging operation, and billing for the charging operation based on the charging rate by the server.

3. The method of claim 1, wherein the charging rate is based on a charging time or a charging power as a unit.

4. The method of claim 1, further comprising setting the charging rate to a second rate when the usage rate is greater than the first threshold value, wherein the second rate is greater than the first rate.

5. A system for charging rate management based on usage rate of charging stations, comprising:
    a charging field comprising a plurality of electric vehicle charging stations for charging at least one electric vehicle; and
    a server connecting to the respective electric vehicle charging station of the charging field via a network, obtaining a usage status of the respective electric vehicle charging station via the network, calculating a usage rate of the charging field according to the usage status of the respective electric vehicle charging station, and determining a charging rate for the charging field according to the usage rate, wherein the server further determines whether the usage rate is greater than a first threshold value, and sets the charging rate to a first rate when the usage rate is not greater than the first threshold value, and the server further determines whether the usage rate is greater than a second threshold value, and sets the charging rate to a differential rate when the usage rate is greater than the second threshold value, wherein the second threshold value is greater than the first threshold value, and the differential rate starts from a specific rate and increases as the charging time continues.

6. The system of claim 5, wherein the server further receives a charging request from a mobile device or from a specific electric vehicle charging station of the electric vehicle charging stations, and in response to the charging request, instructs the specific electric vehicle charging station to perform a charging operation, and bills for the charging operation based on the charging rate.

7. The system of claim 5, wherein the charging rate is based on a charging time or a charging power as a unit.

8. The system of claim 5, wherein the server sets the charging rate to a second rate when the usage rate is greater than the first threshold value, wherein the second rate is greater than the first rate.

* * * * *